US010535168B2

(12) United States Patent
Gu et al.

(10) Patent No.: US 10,535,168 B2
(45) Date of Patent: Jan. 14, 2020

(54) IMAGE ENHANCEMENT USING SEISMIC PARTITION IMAGES

(71) Applicant: SCHLUMBERGER TECHNOLOGY CORPORATION, Sugar Land, TX (US)

(72) Inventors: Ruoyu Gu, Katy, TX (US); Mohammed Hegazy, Houston, TX (US); Stacey Buzzell, Cypress, TX (US); Olga Zdraveva, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 218 days.

(21) Appl. No.: 15/059,078

(22) Filed: Mar. 2, 2016

(65) Prior Publication Data
US 2017/0256080 A1    Sep. 7, 2017

(51) Int. Cl.
*G06T 1/60* (2006.01)
*G06T 11/60* (2006.01)
*E21B 7/00* (2006.01)
*E21B 41/00* (2006.01)

(52) U.S. Cl.
CPC ............... *G06T 11/60* (2013.01); *E21B 7/00* (2013.01); *E21B 41/0092* (2013.01); *G06T 2207/30181* (2013.01)

(58) Field of Classification Search
CPC ............ G06T 11/60; G06T 7/0026; G06T 2207/30181; E21B 7/00; E21B 41/0092
USPC ....... 345/619, 620, 621, 625, 630, 634, 637, 345/639, 640, 642
See application file for complete search history.

(56) References Cited

U.S. PATENT DOCUMENTS

| 2011/0118985 A1* | 5/2011 | Aarre ..................... G01V 1/301 702/16 |
| 2012/0092962 A1 | 4/2012 | Nichols et al. |
| 2013/0265852 A1 | 10/2013 | Nichols et al. |
| 2014/0032119 A1 | 1/2014 | Landa et al. |
| 2014/0163888 A1* | 6/2014 | Bowler .................. G01V 11/00 702/9 |

(Continued)

OTHER PUBLICATIONS

Gherasim, M., Albertin, U., Nolte, B., Askim, O. J., Trout, M., & Hartman, K. (2010). Wave-equation angle-based illumination weighting for optimized subsalt imaging. In SEG Technical Program Expanded Abstracts 2010 (pp. 3293-3297). Society of Exploration Geophysicists, pp. 1-5.*

(Continued)

*Primary Examiner* — Sarah Lhymn
(74) *Attorney, Agent, or Firm* — Michael Guthrie

(57) ABSTRACT

A method for generating an image of a subterranean formation includes receiving seismic data that was collected from seismic waves that propagated in the subterranean formation. Partition images are generated using the seismic data. A geological model of the subterranean formation is generated. Dip fields in the partition images are determined. A target dip field in the geological model is determined. A degree of correlation between the respective dip fields and the target dip field is determined. Weights are assigned to the partition images based upon the degrees of correlation to produce weighted partition images. The image of the subterranean formation is generated by stacking the weighted partition images.

20 Claims, 13 Drawing Sheets

(56) References Cited

U.S. PATENT DOCUMENTS

2015/0110360 A1     4/2015   Zhao et al.
2015/0235081 A1     8/2015   Jiang et al.
2016/0291183 A1*   10/2016   Hu ........................ G01V 1/282

OTHER PUBLICATIONS

O'Briain, M., Smith, et al, "Improved subsalt imaging and salt interpretation by RTM scenario testing and image partitioning", 83rd Annual International Meeting, SEG, Expanded Abstracts, 2013, p. 3856-3860.

Xu, Q., et al, "Reverse time migration using vector offset output to improve subsalt imaging—A case study at the Walker Ridge GOM": 2011, Presented at the 73rd Annual International Conference and Exhibition, EAGE.

Zhao, C., et, al, "Improving Interpretability of Subsalt Images by Image Conditioning and Enhancement with RTM Vector Image Partitions", 2015, 77th EAGE Conference & Exhibition.

International Search Report and Written Opinion issued in the corresponding PCT application PCT/US2017/019800, dated Jun. 7, 2017 (9 pages).

International Preliminary Report on Patentability issued in the corresponding PCT application PCT/US2017/019800, dated Sep. 4, 2018 (5 pages).

Extended Search Report issued in the corresponding EP Application 17760561.5 dated Oct. 10, 2019 (4 pages).

\* cited by examiner

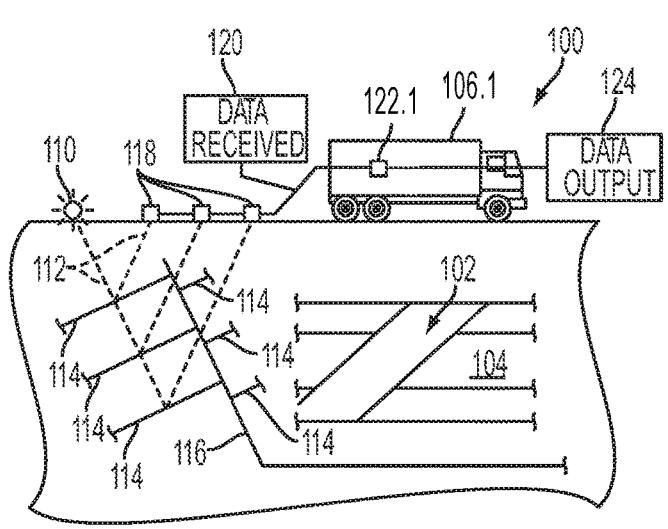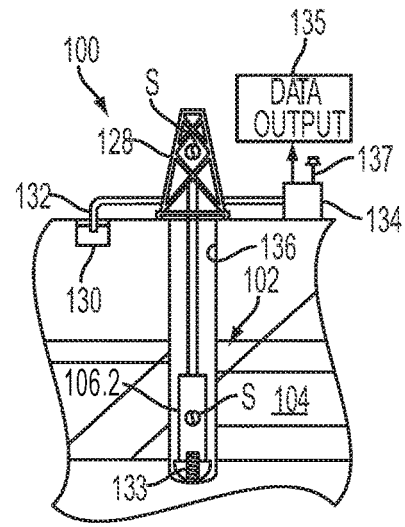
FIG. 1A  FIG. 1B
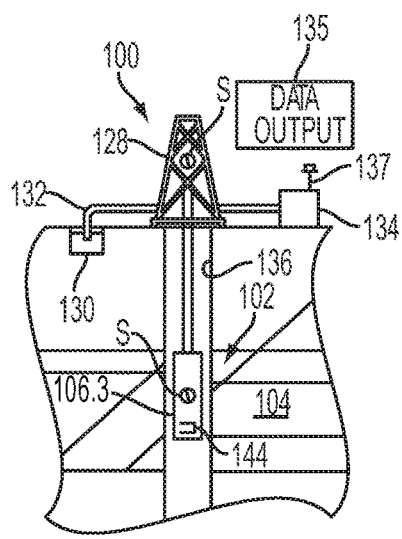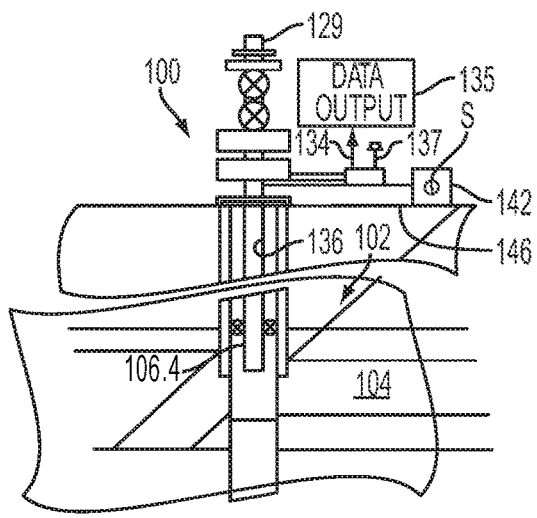
FIG. 1C  FIG. 1D

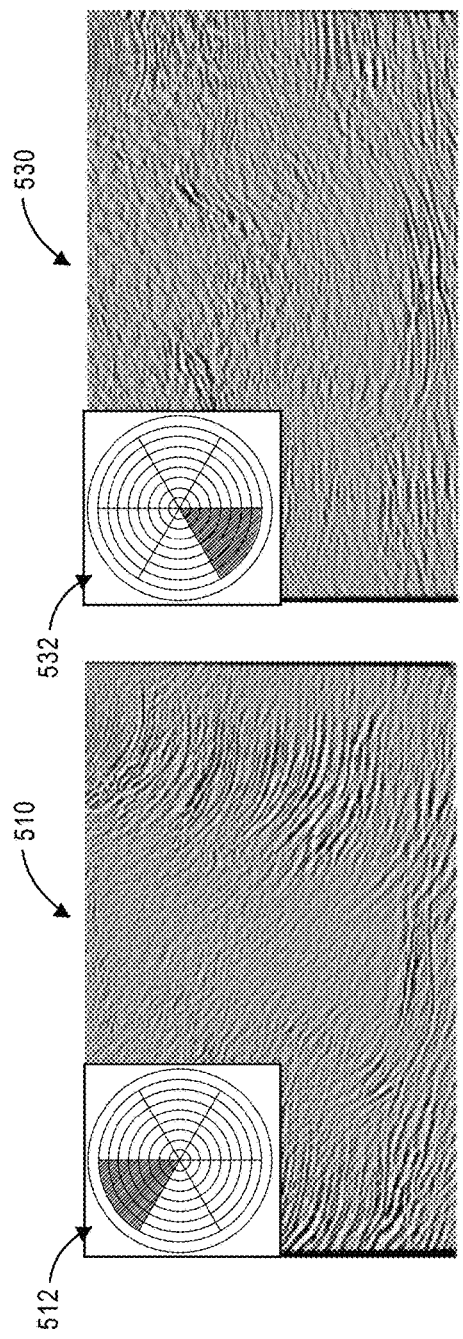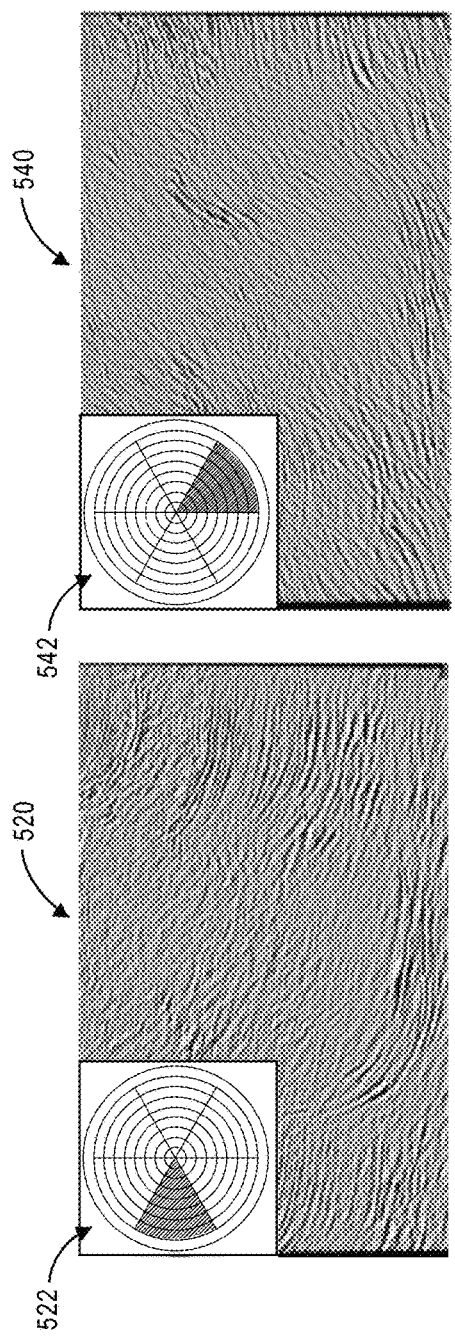
FIG. 5A  FIG. 5B  FIG. 5C  FIG. 5D

IMAGE ENHANCEMENT USING SEISMIC PARTITION IMAGES

BACKGROUND

Interpretation guided image enhancement ("IGIE") is a method for enhancing or optimizing an image. IGIE may include receiving a plurality of partition images that, when aggregated (i.e., "stacked"), produce a raw image of a subterranean formation. The partition images may be taken in different directions. As such, the partition images may illuminate different dipping directions. A target dipping direction may have a majority of its illumination from a specific (e.g., narrow) direction. This may be the case for a high dipping event or a complicated velocity model in a subsalt area. As a result, the partition images that do not illuminate the target dipping direction result in noise that makes the illumination of the target dipping direction more difficult.

SUMMARY

Embodiments of the present disclosure may provide a method for generating an image of a subterranean formation is disclosed. The method includes receiving seismic data that was collected from seismic waves that propagated in the subterranean formation. Partition images are generated using the seismic data. A geological model of the subterranean formation is generated. Dip fields in the partition images are determined. A target dip field in the geological model is determined. A degree of correlation between the respective dip fields and the target dip field is determined. Weights are assigned to the partition images based upon the degrees of correlation to produce weighted partition images. The image of the subterranean formation is generated by stacking the weighted partition images.

In an embodiment, the partition images produce a raw image when stacked.

In an embodiment, the raw image represents a reverse time migration of the subterranean formation.

In an embodiment, the geological model includes the raw image and one or more interpreted horizons.

In an embodiment, the partition images illuminate different dipping directions in the subterranean formation.

In an embodiment, a first of the partition images includes vector image partitions, and the vector image partitions produce the first partition image when stacked.

In an embodiment, assigning weights to the partition images includes increasing a percentage that a first partition image of the partition images contributes to the image when the weighted partition images are stacked. The degree of correlation of the first partition image is greater than or equal to a predetermined amount.

In an embodiment, assigning weights to the partition images includes decreasing a percentage that a second partition image of the partition images contributes to the image when the weighted partition images are stacked. The degree of correlation of the second partition image is less than the predetermined amount.

In an embodiment, the method also includes comparing the image of the subterranean formation to the geological model, and performing another iteration of at least a portion of the method using the image as the geological model when similarities between the image of the subterranean formation and the geological model are less than a predetermined amount.

In an embodiment, the method also includes performing a drilling action using the image of the subterranean formation.

Embodiments of the disclosure may also provide a non-transitory computer-readable medium. The medium stores instructions that, when executed by a processor of a computing system, cause the computing system to perform operations. The operations include receiving seismic data that was collected from seismic waves that propagated in the subterranean formation. Partition images are generated using the seismic data. A geological model of the subterranean formation is generated. Dip fields in the partition images are determined. A target dip field in the geological model is determined. A degree of correlation between the respective dip fields and the target dip field is determined. Weights are assigned to the partition images based upon the degrees of correlation to produce weighted partition images. The image of the subterranean formation is generated by stacking the weighted partition images.

In an embodiment, the partition images produce a raw image when stacked.

In an embodiment, the raw image represents a reverse time migration of the subterranean formation.

In an embodiment, the geological model includes the raw image and one or more interpreted horizons.

In an embodiment, the partition images illuminate different dipping directions in the subterranean formation.

Embodiments of the disclosure may also provide a computing system. The computing system includes a processor and a memory system. The memory system includes a non-transitory computer-readable medium storing instructions that, when executed by the processor, cause the computing system to perform operations. The operations include receiving seismic data that was collected from seismic waves that propagated in the subterranean formation. Partition images are generated using the seismic data. A geological model of the subterranean formation is generated. Dip fields in the partition images are determined. A target dip field in the geological model is determined. A degree of correlation between the respective dip fields and the target dip field is determined. Weights are assigned to the partition images based upon the degrees of correlation to produce weighted partition images. The image of the subterranean formation is generated by stacking the weighted partition images.

In an embodiment, a first partition image of the partition images includes vector image partitions, and the vector image partitions produce the first partition image when stacked.

In an embodiment, assigning weights to the partition images includes increasing a percentage that a first of the partition images contributes to the image when the weighted partition images are stacked. The degree of correlation of the first partition image is greater than or equal to a predetermined amount.

In an embodiment, assigning weights to the partition images includes decreasing a percentage that a second partition image of the partition images contributes to the image when the weighted partition images are stacked. The degree of correlation of the second partition image is less than the predetermined amount.

In an embodiment, the operations also include comparing the image of the subterranean formation to the geological model, and performing another iteration of at least a portion of the operations using the image as the geological model when similarities between the image of the subterranean formation and the geological model are less than a predetermined amount.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIGS. 1A, 1B, 1C, 1D, 2, 3A, and 3B illustrate simplified, schematic views of an oilfield and its operation, according to an embodiment.

FIGS. 5A, 5B, 5C, 5D, 5E, and 5F illustrate partition images of the subterranean formation.

DETAILED DESCRIPTION

Figure 2:
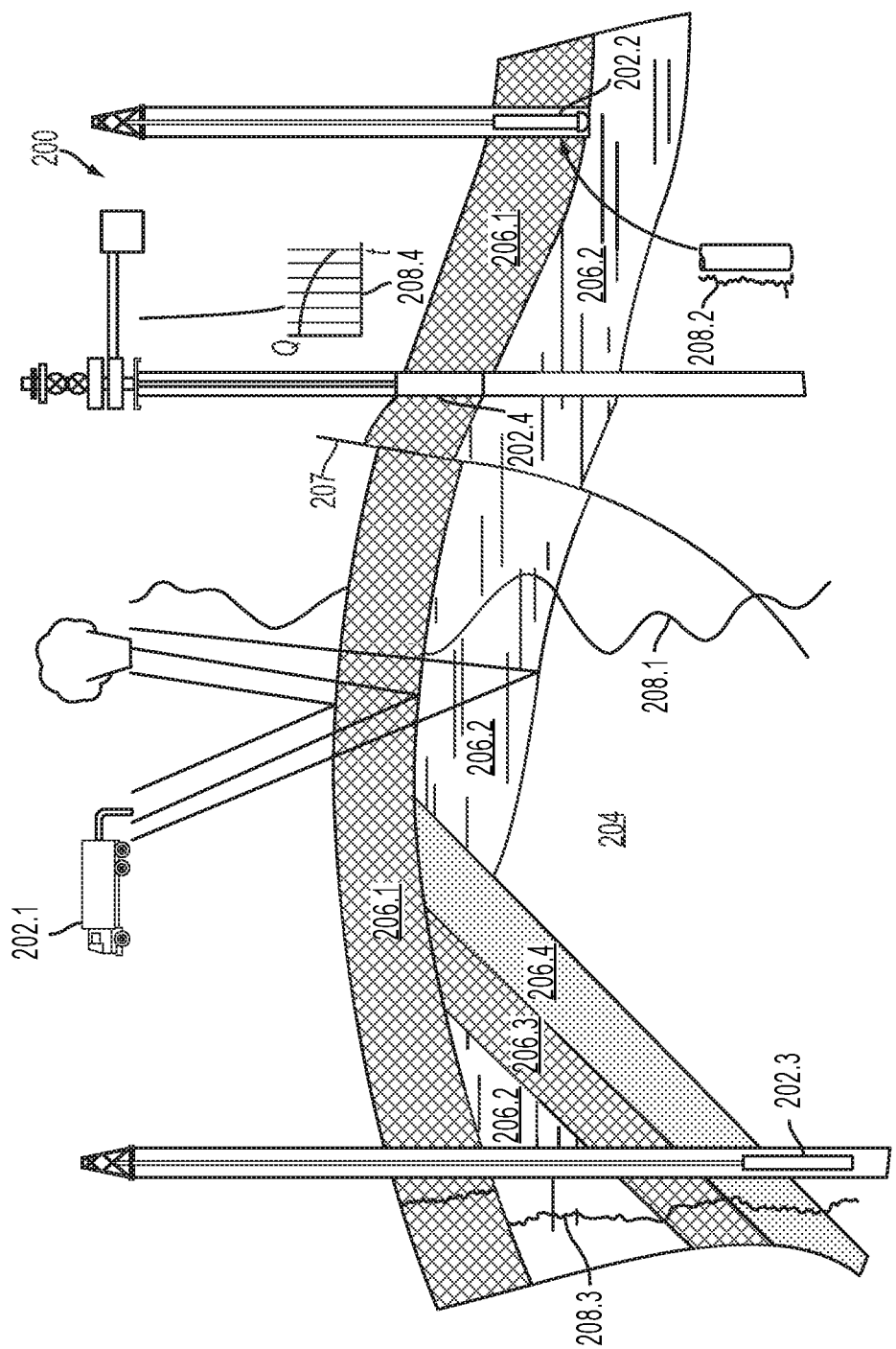

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
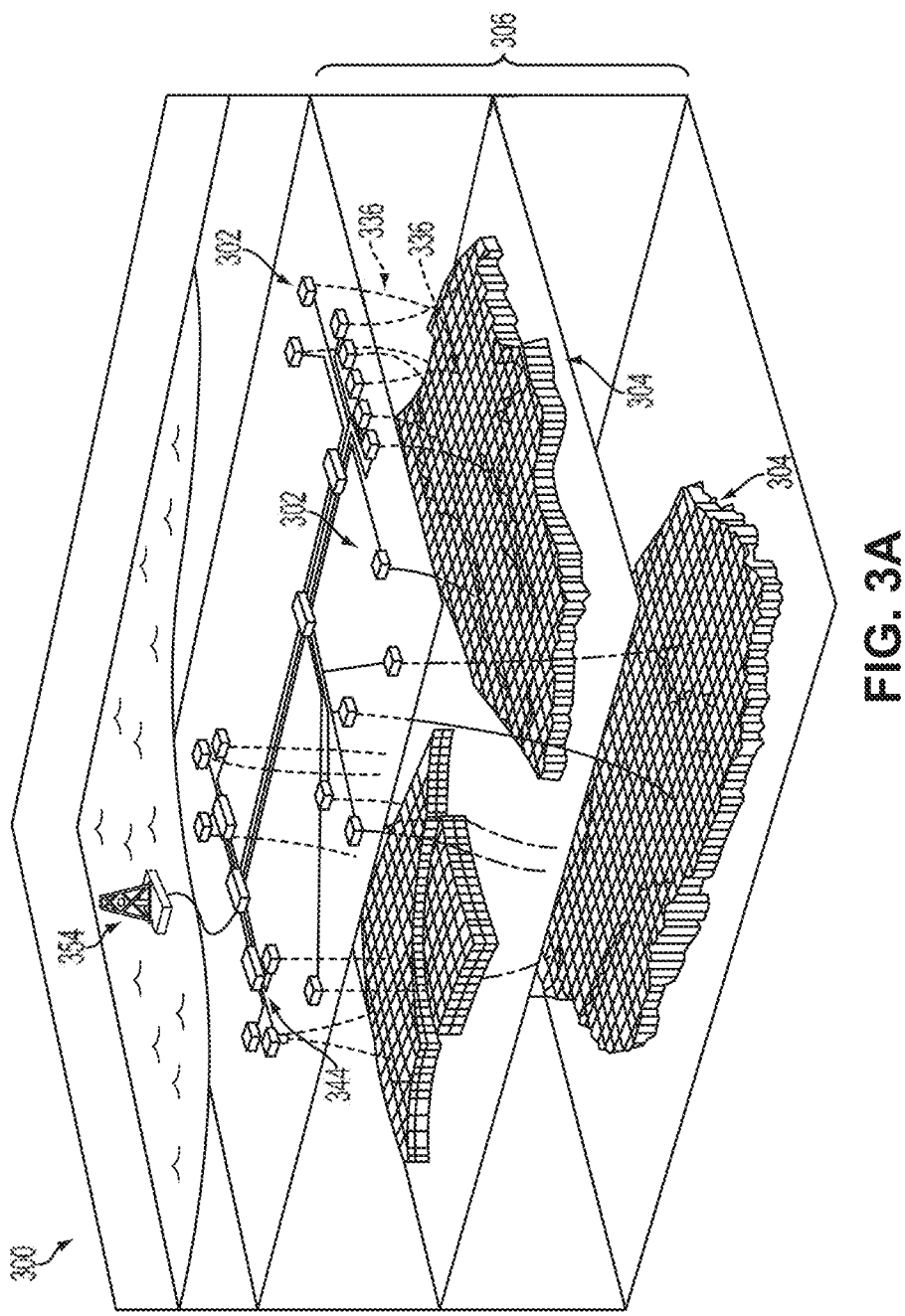

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
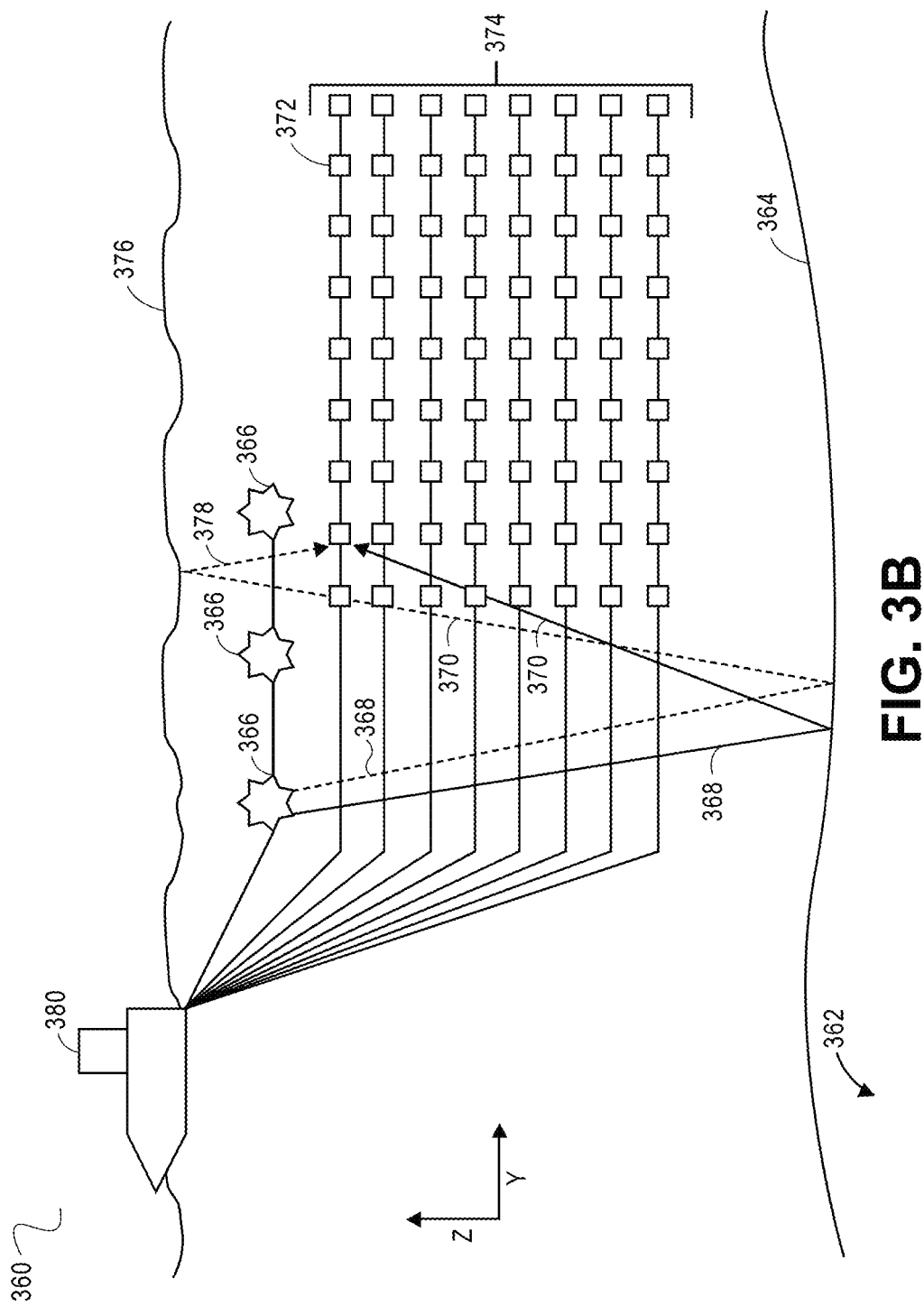

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
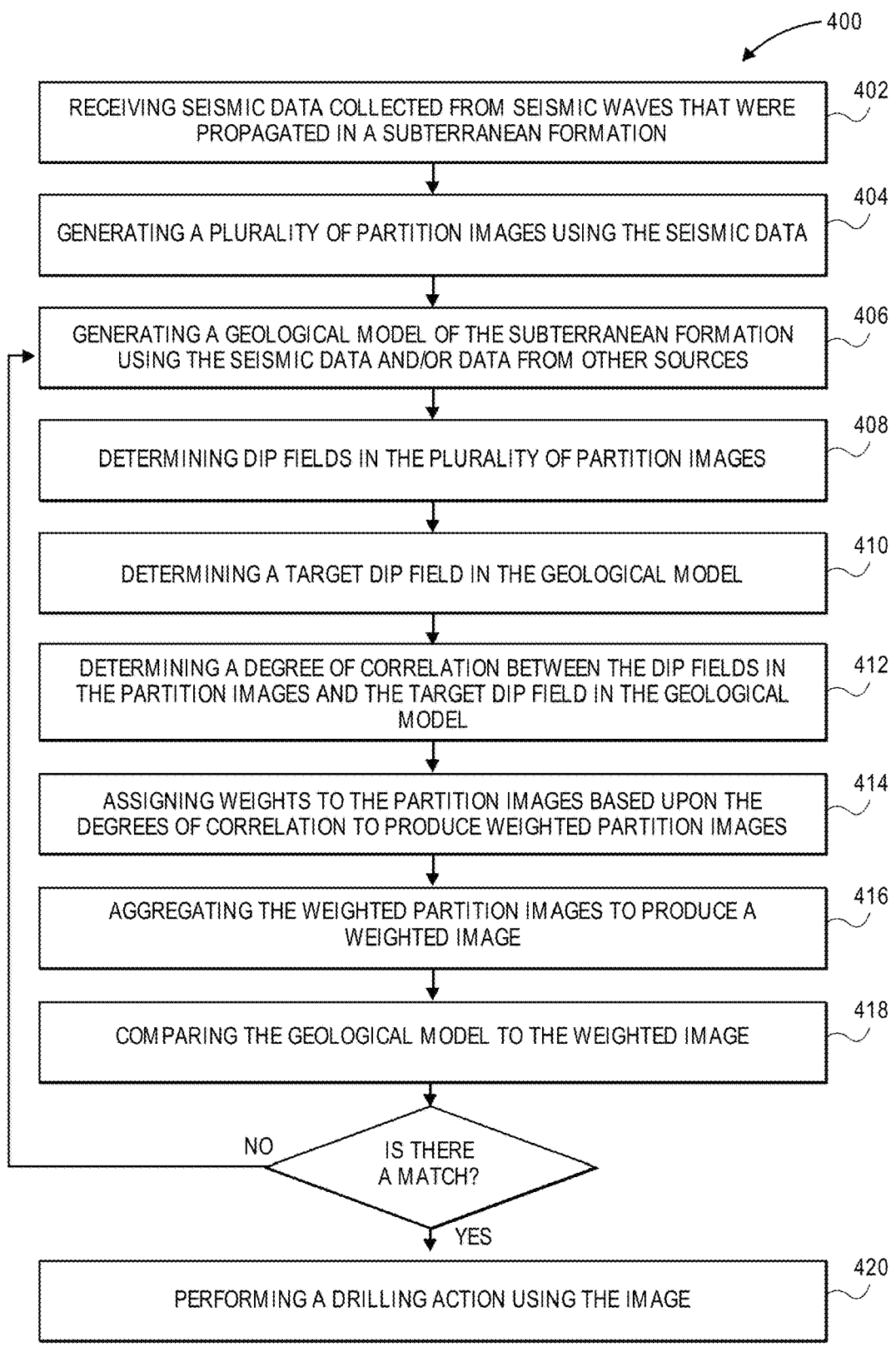
FIG. 4 illustrates a flowchart of a method for generating an image of a subterranean formation, according to an embodiment.

FIG. 4 illustrates a flowchart of a method 400 for generating an image of a subterranean formation, according to an embodiment. More particularly, the method 400 may enhance a raw image of the subterranean formation. The method 400 may generate the image using interpreted guided image enhancement ("IGIE"). The method 400 may begin by receiving seismic data collected from seismic waves that were propagated in a subterranean formation, as at 402. The method 400 may then include generating a plurality of partition images using the seismic data, as at 404. As used herein, a "partition image" refers to an image generated by summation over selected sources (e.g., a subset of the sources) rather than every source, and the selection is based on the relative positions of the sources to the image point. For example, data is obtained from many sources (i.e., shots, a source is a seismic wave emitted by vibroseis or airgun). The data for the respective sources may be processed to generate an image. Then, the images of the sources may be summed to obtain a full image. If the summation is not over every source, but merely a subset of the sources, selected according to the relative positions of the sources to the image point, then a partition image is generated. The selection is according to the relative position of sources, not the absolute position of the sources, which means different points in a partition image may select different sources to sum. For example, there may be 7 sources, whose x positions are −3,−2,−1,0,1,2,3, and the rule of selection for the partition image 1 (2) is that sources are on the left (right) side of the image point. Then, for point A at x=−1.5, its partition 1 is the sum of two sources at x=−3 and −2, and its partition 2 is the sum of the other 5 sources, on the other hand, for point B at x=1.5, its partition 1 is the sum of 5 sources at x=−3,−2,−1,0,1, and its partition 2 is the sum of the other 2 sources at x=2 and 3. As may be seen, the selected sources for point A and B in partition 1 are different.

FIGS. 5A-5F illustrate a plurality of partition images of the subterranean formation (six are shown: 510, 520, 530, 540, 550, 560), according to an embodiment. The partition images 510, 520, 530, 540, 550, 560 may represent reverse time migrations ("RTMs") of the subterranean formation. The relative azimuth directions of the sources with respect to the image point in partition images 510, 520, 530, 540, 550, 560 are represented by the shaded area in the boxes 512, 522, 532, 542, 552, 562. It may be seen that the partition images 510, 520, 530, 540, 550, 560 illuminate different dipping directions. In practice, a greater or fewer number of partition images 510, 520, 530, 540, 550, 560 may be used.

The respective partition images 510, 520, 530, 540, 550, 560 may include one or more vector image partitions ("VIPs"). As used herein, a "vector image partition" or "VIP" refers to the direct output of RTMs formed during the process of collection and summation over seismic sources, in which each output location collects a portion of the sources based on a particular criterion of its relative position to the sources. In one example, the respective partition images 510, 520, 530, 540, 550, 560 may include eight VIPs, represented by the eight concentric rings inside the boxes 512, 522, 532, 542, 552, 562. The first partition image 510 may be produced by aggregating (e.g., stacking) its corresponding eight VIPS, the second partition image 520 may be produced by aggregating (e.g., stacking) its corresponding eight VIPS, and so on. The VIPs are also a type of partition image, and different VIPs may illuminate different dipping directions.

Figure 5E:
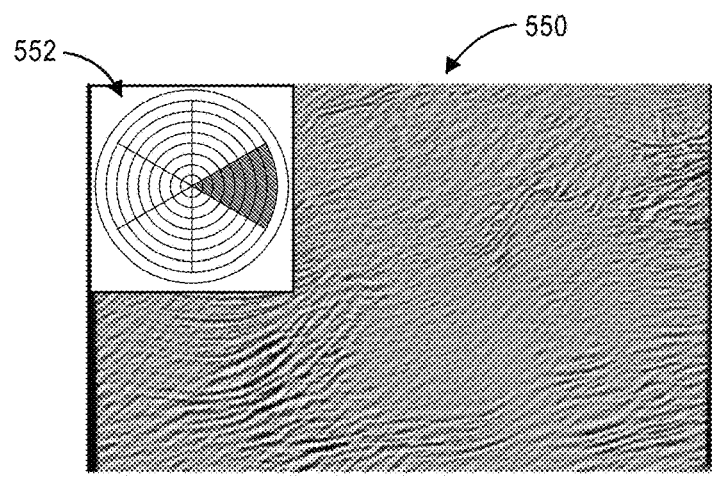
Figure 5F:
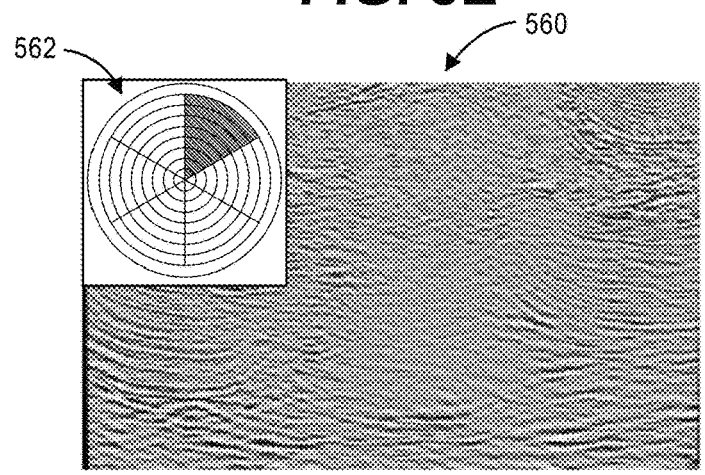
Figure 5G:
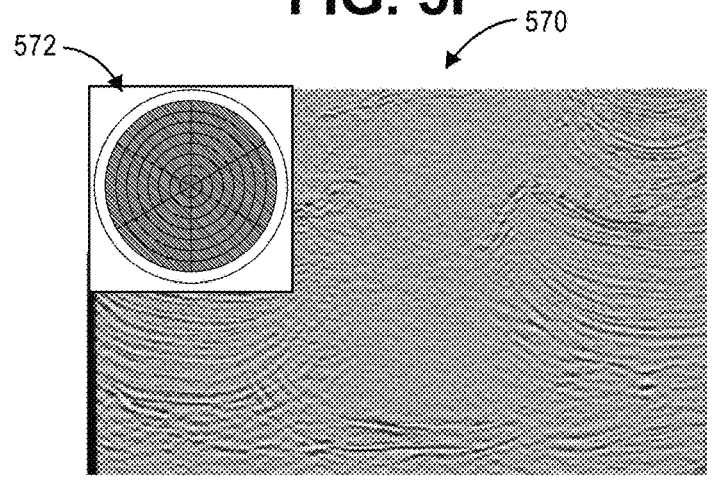
FIG. 5G illustrates a raw image of the subterranean formation obtained by stacking the partition images, according to an embodiment.

FIG. 5G illustrates a raw image 570 of the subterranean formation that is generated using the seismic data, according to an embodiment. The partition images 510, 520, 530, 540, 550, 560 may be aggregated (e.g., stacked) to produce the raw image 570. Thus, in this example, the raw image 570 may include 6 partition images×8 VIPs per partition image=48 VIPs. The raw image 570 may represent a reverse time migration ("RTM") of the subterranean formation.

The method 400 may also include generating a geological model of the subterranean formation using the seismic data and/or data from other sources (e.g., a downhole tool in a wellbore), as at 406. The geological model may include a target area 582 (see FIG. 6). As used herein, a "target area" refers to a portion of the subterranean formation identified by a user where the user intends to increase the accuracy. In one embodiment, the geological model may be or include the raw image 570 having one or more interpreted horizons overlaid thereon.

Figure 6:
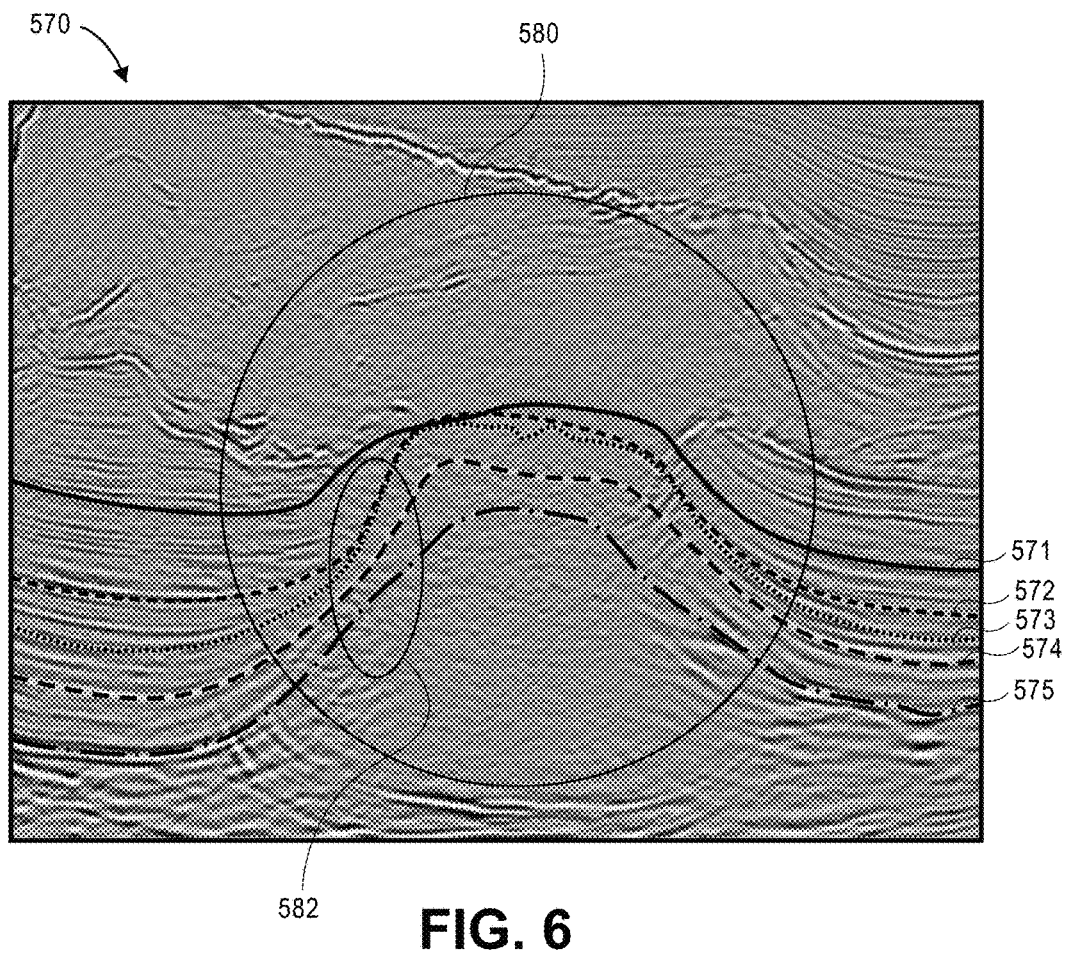
FIG. 6 illustrates the raw image of the subterranean formation (e.g., from FIG. 5G) with a horizon interpretation overlaid thereon, according to an embodiment.

FIG. 6 illustrates the raw image 570 of the subterranean formation (e.g., from FIG. 5G) with one or more interpreted horizons (five are shown: 571-575) overlaid thereon, according to an embodiment. As used herein, an "interpreted horizon" refers to a model or prediction of a surface in a rock, a surface of rock, a distinctive layer of rock, or an interface between two rocks that is represented by a reflection in seismic data. The interface may be or include the contact between two bodies of rock having different seismic velocity, density, porosity, fluid content, or a combination thereof. The interpreted horizons 571-575 may be generated using the seismic data and/or data obtained from a downhole tool in a wellbore. The downhole tool may be or include a measurement-while-drilling ("MWD") tool, a logging-while-drilling ("LWD") tool, or the like. The data obtained by the downhole tool may be or include pressure, temperature, wellbore trajectory, resistivity, porosity, sonic velocity, gamma ray, or a combination thereof.

In instances where the target area 582 is poorly illuminated, the signals are weak and/or overwhelmed by noise, which is often the case in subsalt zones, interpreted horizons 571-575 may be used. In another embodiment, instead of or in addition to interpreted horizons 571-575, the geological model may be or include a reference image (e.g., the raw image 570) with a clear skeleton of the geologic structure of the subterranean formation, such as a post-processed enhanced image.

Figure 7A:
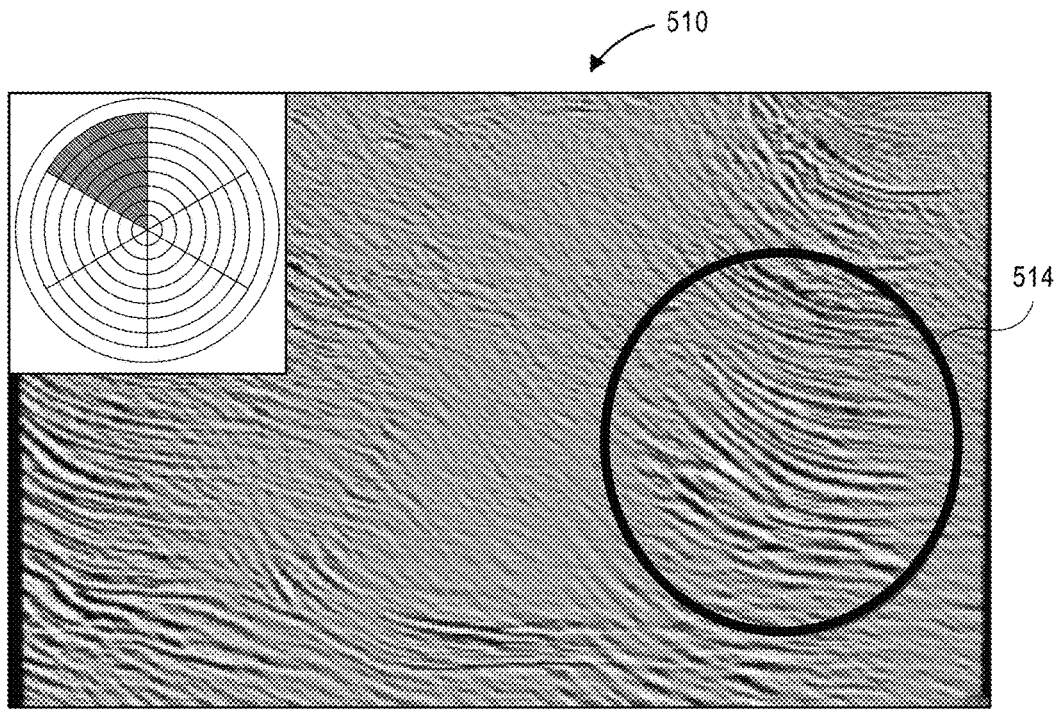
FIGS. 7A and 7B illustrate the partition images from FIGS. 5A and 5E, respectively, with dip fields circled, according to an embodiment.
Figure 7B:
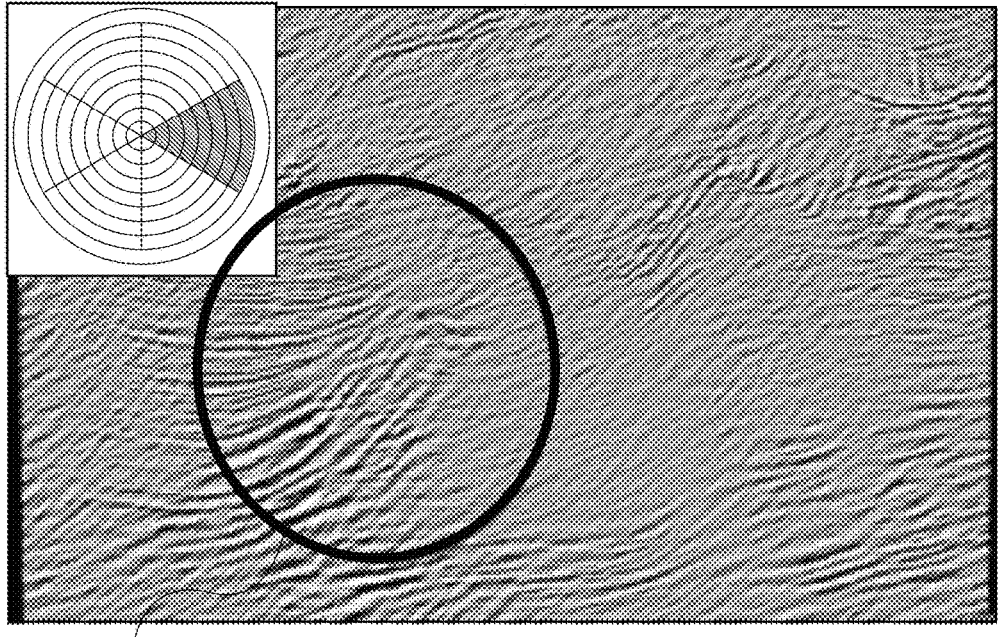

The method 400 may also include determining dip fields in the plurality of partition images 510, 520, 530, 540, 550, 560, as at 408. FIGS. 7A and 7B illustrate the partition images 510, 550 from FIGS. 5A and 5E, respectively, with circles around their (determined) dip fields 514, 554, according to an embodiment. As used herein, a "dip field" refers to a local trend of the slope of the geologic structure at respective points in the subterranean formation. The dip fields may be determined by differentiating the depth of the geologic structure along the two horizontal directions. In at least one embodiment, determining the dip fields for the plurality of partition images 510, 520, 530, 540, 550, 560 may include determining dip fields for the VIPs that make up the partition images 510, 520, 530, 540, 550, 560.

The respective partition images 510, 520, 530, 540, 550, 560 may illuminate different dipping directions. As such, the respective partition images 510, 520, 530, 540, 550, 560 may have their own (e.g., unique) three-dimensional ("3D") dip fields. As used herein, the term "illuminate" refers to seismic wave energy falling on or bouncing off of a reflector and the reflecting being detected. As used herein, the term "dipping direction" refers to a direction that is normal (i.e., perpendicular) to the surface of the reflector.

The method 400 may also include determining a target dip field 580 in the geological model (e.g., in the raw image 570 with the interpreted horizons 571-575), as at 410. As used herein, a "target dip field" refers to a dip field in the geological model that the user wants to illuminate. As shown, a circle is placed around the target dip field 580. A majority of the illumination of the target dip field 580 may come from a subset of the partition images 510, 520, 530, 540, 550, 560. This may be the case, for example, for a high dipping event or a complicated velocity model in the subsalt area.

The method 400 may also include determining a degree of correlation between the dip fields (e.g., dip fields 514, 554) in the partition images 510, 520, 530, 540, 550, 560 and the target dip field 580 in the geological model (e.g., in the raw image 570 with the interpreted horizons 571-575), as at 412. The dip fields 514, 554 in the partition images 510, 550 may have a higher degree of correlation (i.e., be "closer") to the target dip field 580 in the geological model (e.g., in the raw image 570 with the interpreted horizons 571-575) than the dip fields in the other partition images 520, 530, 540, 560. More particularly, the seismic event(s) in the dip fields 514, 554 in the partition images 510, 550 may have a higher degree of correlation with the horizons 571-575 in the target dip field 580 in the geological model than the seismic event(s) in the dip fields in the other partition images 520, 530, 540, 560. Dip fields with higher degrees of correlation may better illuminate the target dip field 580, whereas dip fields with lower degrees of correlation may introduce noise to the target dip field 580. As used herein, "noise" refers to disturbances in the seismic data that make the seismic event in the target dip field 580 more difficult to observe. The noise may be caused by unwanted seismic energy, such as shot generation ground roll, surface waves, multiples, or a combination thereof.

The degree of correlation in the partition images 510, 550 may be greater than or equal to a predetermined amount, and the degree of correlation in the partition images 520, 530, 540, 560 may be less than the predetermined amount. The degree of correlation may be determined by the relative angle between the dip field in the partition images 510, 520, 530, 540, 550, 560 and the target dip field 580. Smaller angles result in greater degrees of correlation. Similarly, larger angles results in lesser degrees of correlation.

The method 400 may also include assigning weights to the partition images 510, 520, 530, 540, 550, 560 based upon the degrees of correlation to produce weighted partition images, as at 414. In at least one embodiment, this may include assigning weights to the VIPs that make up the partition images 510, 520, 530, 540, 550, 560 (e.g., based upon the degrees of correlation in the VIPs). The weights may depend (e.g., directly) upon the degrees of correlation. In other words, higher weights may be assigned to partition images 510, 550 with higher degrees of correlation, and lower weights may be assigned to partition images 520, 530, 540, 560 with lower degrees of correlation.

Figure 8:
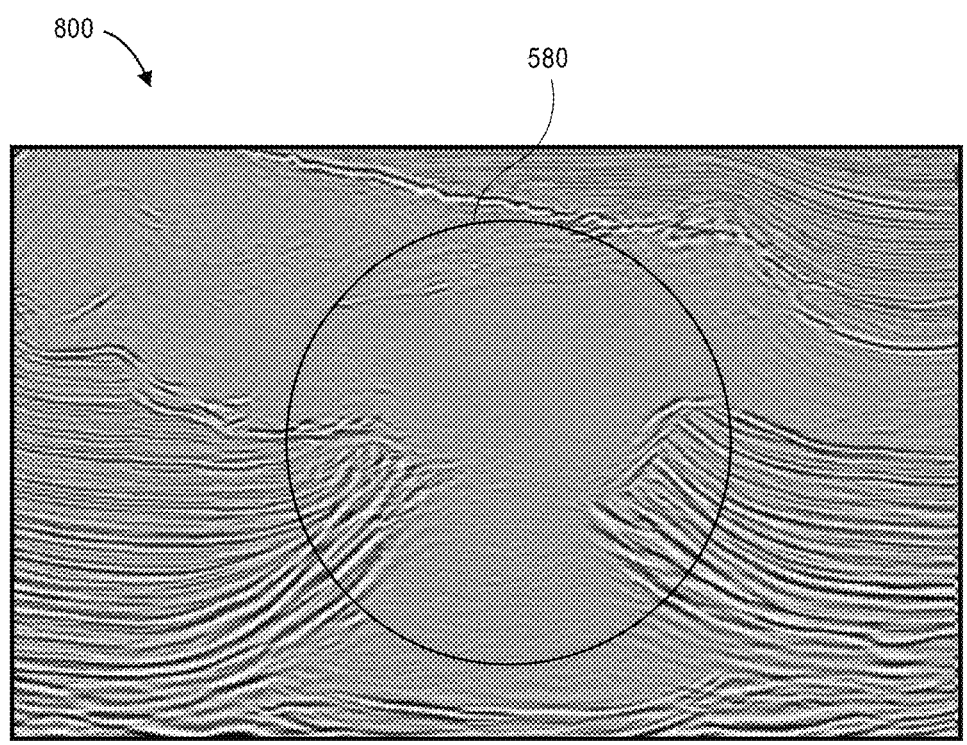
FIG. 8 illustrates an enhanced image of the subterranean formation produced using the method from FIG. 4, according to an embodiment.

The method 400 may also include aggregating (e.g., stacking) the weighted partition images 510, 520, 530, 540, 550, 560 to produce an image, as at 416. FIG. 8 illustrates an image 800 of the subterranean formation produced by aggregating the weighted partition images 510, 520, 530, 540, 550, 560, according to an embodiment. The raw image 570 in FIG. 5G and the image 800 in FIG. 8 may be produced by aggregating (e.g., stacking) the partition images 510, 520, 530, 540, 550, 560. However, the raw image 570 in FIG. 5G is produced by aggregating (e.g., stacking) unweighted partition images 510, 520, 530, 540, 550, 560, and the image 800 in FIG. 8 may be produced by aggregating (e.g., stacking) weighted partition images 510, 520, 530, 540, 550, 560. As used herein, "unweighted" refers to partition images and/or VIPs that are factored into the aggregation (e.g., stacking) evenly. In other words, a percentage that the respective partition images 510, 520, 530, 540, 550, 560 contribute to the image 570 may be the same. For example, the respective unweighted partition images 510, 520, 530, 540, 550, 560 may account for ⅙ of the raw image 570. In another example, the respective unweighted VIPs in the partition images 510, 520, 530, 540, 550, 560 may account for ¹⁄₄₈ of the raw image 570.

In contrast, the term "weighted" refers to partition images or VIPS that may be factored into the aggregation (e.g., stacking) unevenly, depending upon the degrees of correlation. In other words, a percentage that the respective partition images 510, 520, 530, 540, 550, 560 contribute to the image 570 may not be the same (e.g., when the degrees of correlation are not the same). For example, the partition images 510, 550 may have their percentages increased because they have degrees of correlation greater than a predetermined amount, and the partition images 520, 530, 540, 560 may have their percentages decreased because they have degrees of correlation less than the predetermined amount. In this example, the partition image 510 may account for ⅓ of the image 800, and the partition image 550 may account for ⅓ of the image 800, and the respective partition images 520, 530, 540, 560 may account for ¹⁄₁₂ of the image 800. This may have the effect of amplifying or boosting the seismic signals in the directions that illuminate the target dip field 580 (i.e., the directions that produced partition images 510, 550), and reducing or suppressing the seismic signals in the directions that introduced noise to the target dip field 580 (i.e., the directions that produced partition images 520, 530, 540, 560).

If the seismic signals in the direction that produce the partition image 510 illuminate the target dip field 580 more than the seismic signals that produce the partition images 550, the partition image 510 may have contribute a greater percentage to the image 800 than the partition image 550. The VIPs that make up the respective partition images 510, 520, 530, 540, 550, 560 may have the same weights/percentages, or the VIPs may have different weights/percentages (e.g., when the VIPs in the respective 510, 520, 530, 540, 550, 560 have different degrees of correlation).

The method 400 may also include comparing the geological model (e.g., in the raw image 570 with the interpreted horizons 571-575) to the image 800, as at 418. Another iteration of at least a portion of the method 400 may be performed using the image 800 as the raw image when similarities between the geological model and the image 800 are less than a predetermined amount (i.e., not a match).

The method 400 may also include performing a drilling action using the image 800, as at 420. The drilling action may be performed when the similarities between the geological model and the image 800 are greater than or equal to than the predetermined amount (i.e., a match). The drilling action may include drilling a wellbore at a predetermined location in response to the data in the image 800 (e.g., the target dip field 580). In another embodiment, the drilling action may include varying a trajectory of a downhole tool to vary a trajectory of the wellbore in response to the data in the image 800 (e.g., the target dip field 580). In another embodiment, the drilling action may include varying a weight-on-bit ("WOB") of the downhole tool at one or more locations in the subterranean formation in response to the data in the image 800 (e.g., the target dip field 580). In another embodiment, the drilling action may include varying a flow rate of fluid being pumped into the wellbore in response to the data in the image 800 (e.g., the target dip field 580). In another embodiment, the drilling action may include measuring one or more parameters in the subterranean formation using the downhole tool in response to the data in the image 800 (e.g., the target dip field 580). The downhole tool may be or include a measurement-while-drilling ("MWD") tool, a logging-while-drilling ("LWD") tool, or the like. The parameters measured by the downhole tool may be or include pressure, temperature, wellbore trajectory, resistivity, porosity, sonic velocity, gamma ray, or a combination thereof.

Figure 9A:
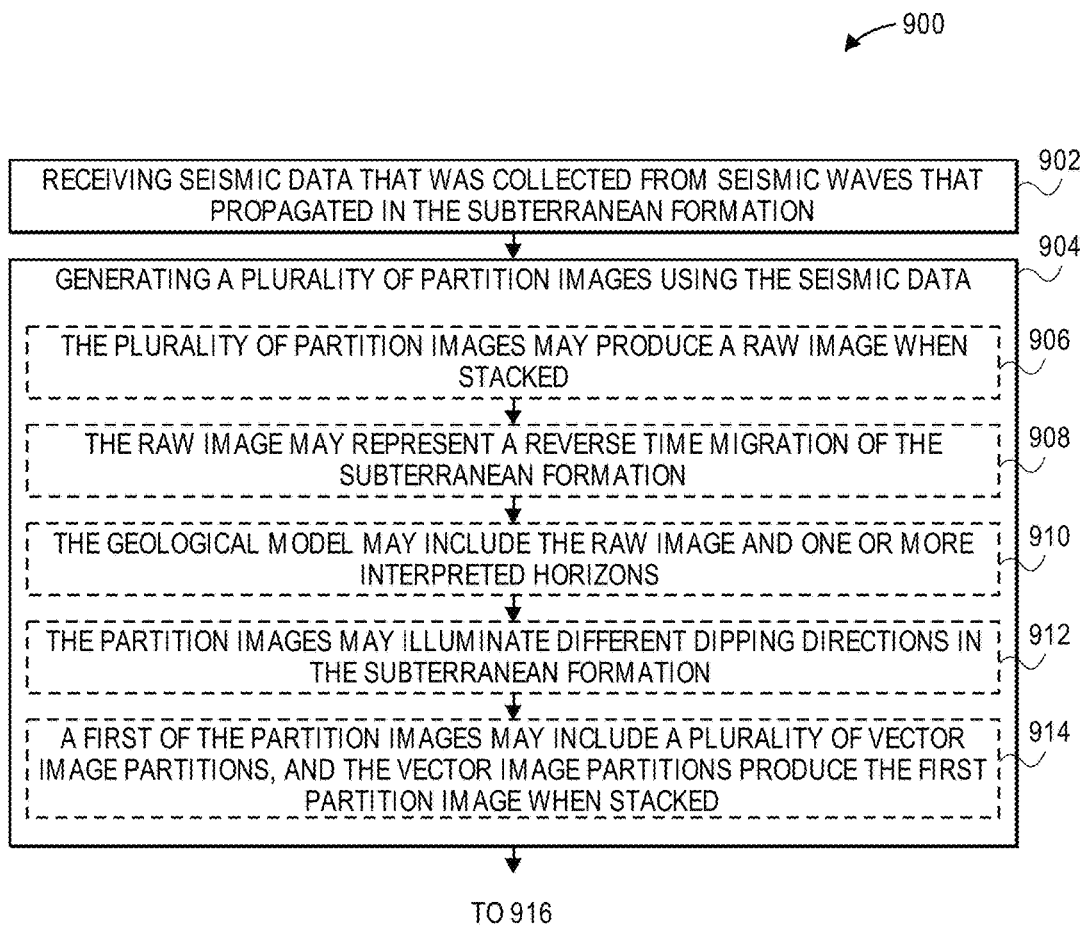
FIGS. 9A and 9B illustrate another flowchart of a method for generating an image of a subterranean formation, according to an embodiment.
Figure 9B:
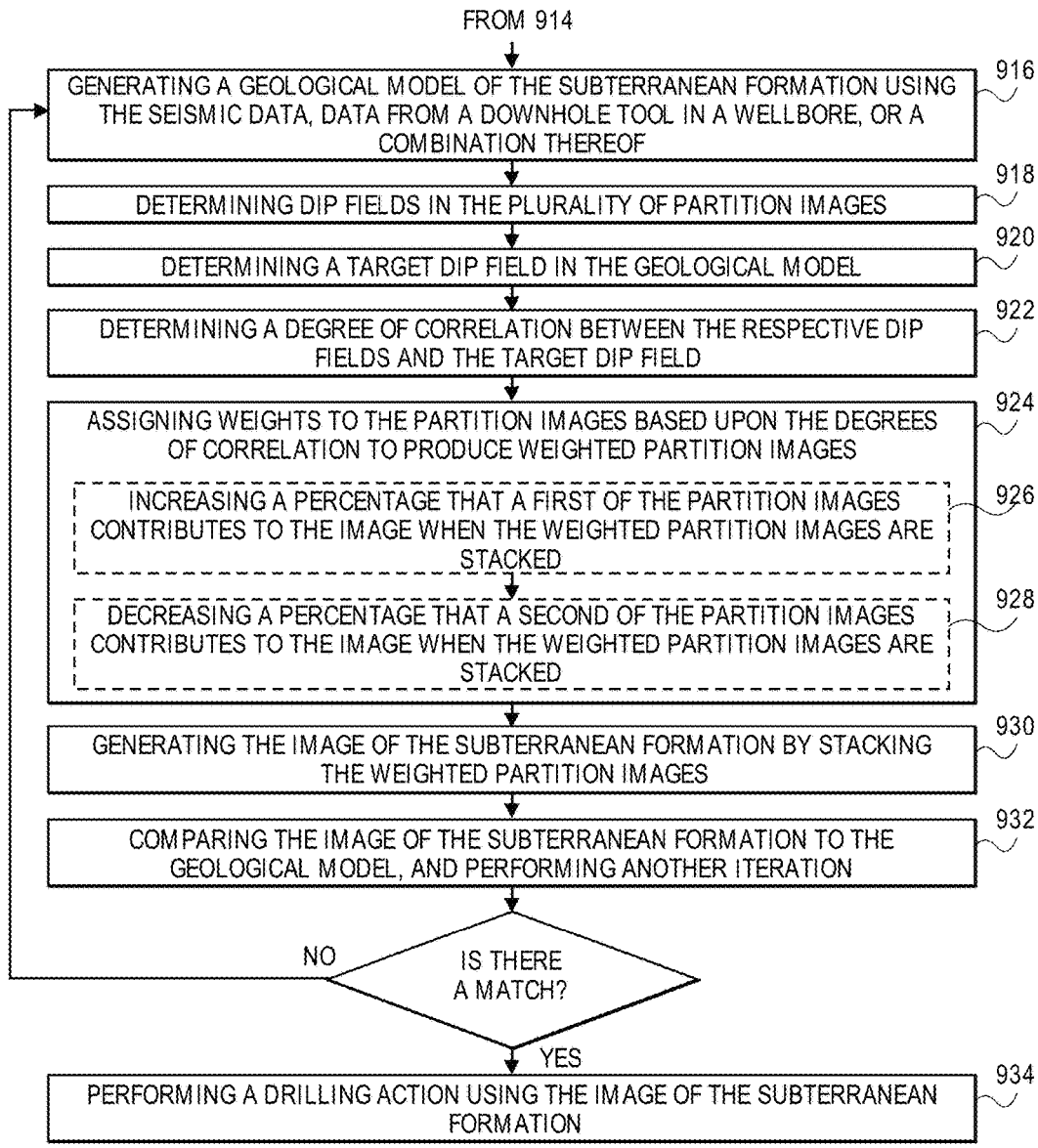

FIGS. 9A and 9B illustrate another flowchart of a method 900 for generating an image of a subterranean formation, according to an embodiment. The method 900 may include receiving seismic data that was collected from seismic waves that propagated in the subterranean formation, as at 902. The method 900 may also include generating a plurality of partition images using the seismic data, as at 904. The plurality of partition images may produce a raw image when stacked, as at 906. The raw image may represent a reverse time migration of the subterranean formation, as at 908. The geological model may include the raw image and one or more interpreted horizons, as at 910. The partition images may illuminate different dipping directions in the subterranean formation, as at 912. A first of the partition images may include a plurality of vector image partitions, and the vector image partitions produce the first partition image when stacked, as at 914.

The method 900 may also include generating a geological model of the subterranean formation using the seismic data, data from a downhole tool in a wellbore, or a combination thereof, as at 916. The method 900 may also include determining dip fields in the plurality of partition images, as at 918. The method 900 may also include determining a target dip field in the geological model, as at 920. The method 900 may also include determining a degree of correlation between the respective dip fields and the target dip field, as at 922. The method 900 may also include assigning weights to the partition images based upon the degrees of correlation to produce weighted partition images, as at 924. Assigning weights to the partition images may include increasing a percentage that a first of the partition images contributes to the image when the weighted partition images are stacked, where the degree of correlation of the first partition image is greater than or equal to a predetermined amount, as at 926. Assigning weights to the partition images may also include decreasing a percentage that a second of the partition images contributes to the image when the weighted partition images are stacked, where the degree of correlation of the second partition image is less than the predetermined amount, as at 928.

The method 900 may also include generating the image of the subterranean formation by stacking the weighted partition images, as at 930. The method 900 may also include comparing the image of the subterranean formation to the geological model, and performing another iteration of at least a portion of the method 900 using the image as the geological model when similarities between the image of the subterranean formation and the geological model are less than a predetermined amount, as at 932. The method 900 may also include performing a drilling action using the image of the subterranean formation, as at 934.

Figure 10:
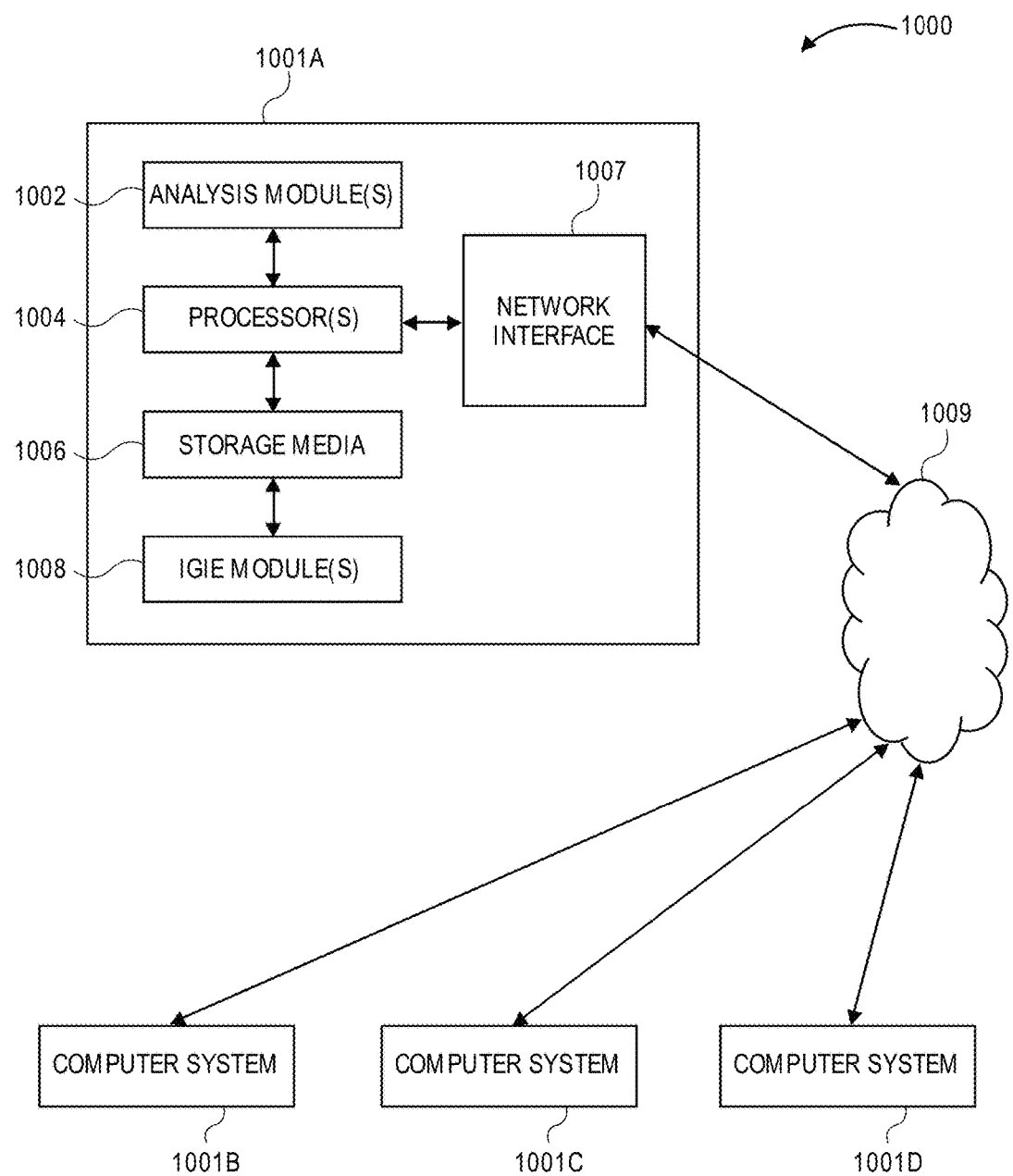
FIG. 10 illustrates a schematic view of a computing or processor system for performing the method, according to an embodiment.

FIG. 10 illustrates a schematic view of a computing or processor system for performing the method, according to an embodiment. The computing system 1000 may include a computer or computer system 1001A, which may be an individual computer system 1001A or an arrangement of distributed computer systems. The computer system 1001A includes one or more analysis modules 1002 that are configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in some example embodiments of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more IGIE module(s) 1008. In the example of computing system 1000, computer system 1001A includes the IGIE module 1008. In some embodiments, a single IGIE module may be used to perform at least some aspects of one or more embodiments of the method 400 disclosed herein. In alternate embodiments, a plurality of IGIE modules may be used to perform at least some aspects of method 400 disclosed herein.

It should be appreciated that computing system 1000 is but one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Geologic interpretations, models and/or other interpretation aids may be refined in an iterative fashion; this concept is applicable to methods as discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated. Additional information supporting the disclosure is contained in the appendix attached hereto.

What is claimed is:

1. A method for generating an image of a subterranean formation, comprising:
   receiving seismic data that was collected from seismic waves that propagated in the subterranean formation;
   generating a plurality of partition images using the seismic data;
   generating a geological model of the subterranean formation;
   determining dip fields in the plurality of partition images;
   determining a target dip field in the geological model;
   assigning weights to one or more partition images in the plurality of partition images based at least upon a relative angle between the respective dip fields and the target dip field to produce weighted partition images; and
   generating the image of the subterranean formation by stacking the weighted partition images.

2. The method of claim 1, wherein the plurality of partition images produce a raw image when stacked.

3. The method of claim 2, wherein the raw image represents a reverse time migration of the subterranean formation.

4. The method of claim 3, wherein the geological model comprises the raw image and one or more interpreted horizons.

5. The method of claim 1, wherein the partition images illuminate different dipping directions in the subterranean formation.

6. The method of claim 1, wherein a first partition image of the partition images comprises a plurality of vector image partitions, and wherein the vector image partitions produce the first partition image when stacked.

7. The method of claim 1, wherein assigning weights to the partition images comprises increasing a percentage that a first partition image of the partition images contributes to the image when the weighted partition images are stacked.

8. The method of claim 7, wherein assigning weights to the partition images comprises decreasing a percentage that a second partition image of the partition images contributes to the image when the weighted partition images are stacked.

9. The method of claim 1, further comprising:
   comparing the image of the subterranean formation to the geological model; and
   performing another iteration of at least a portion of the method using the image as the geological model when similarities between the image of the subterranean formation and the geological model are less than a predetermined amount.

10. The method of claim 1, further comprising performing a drilling action using the image of the subterranean formation.

11. The method of claim 1, wherein assigning weights to the one or more partition images comprises assigning a higher weight to a first of the partition images and assigning a lower weight to a second of the partition images, wherein the first partition image with the higher weight contributes a greater percentage to the image when the first and second partition images are stacked than the second partition image with the lower weight.

12. The method of claim 1, wherein each of the one or more partition images comprises a plurality of vector image partitions, and wherein the weights are assigned to the plurality of vector image partitions in the one or more partition images based at least upon a relative angle between the respective dip fields in the plurality of vector image partitions and the target dip field to produce the weighted partition images.

13. The method of claim 1, wherein the seismic data is captured by a first source, wherein the geological model is generated using data captured by a second source that is different from the first source, and wherein the second source comprises a downhole tool in a wellbore.

14. The method of claim 1, wherein the respective partition images each comprise a unique three-dimensional dip field.

15. A non-transitory computer-readable medium storing instructions that, when executed by one or more processors of a computing system, cause the computing system to perform operations, the operations comprising:
receiving seismic data that was collected from seismic waves that propagated in a subterranean formation;
generating a plurality of partition images using the seismic data;
generating a geological model of the subterranean formation;
determining dip fields in the plurality of partition images;
determining a target dip field in the geological model;
assigning weights to one or more partition images in the plurality of partition images based at least upon a relative angle between the respective dip fields and the target dip field to produce weighted partition images; and
generating the image of the subterranean formation by stacking the weighted partition images.

16. The non-transitory computer-readable medium of claim 15, wherein the plurality of partition images produce a raw image when stacked.

17. The non-transitory computer-readable medium of claim 16, wherein the raw image represents a reverse time migration of the subterranean formation.

18. The non-transitory computer-readable medium of claim 17, wherein the geological model comprises the raw image and one or more interpreted horizons.

19. The non-transitory computer-readable medium of claim 15, wherein the partition images illuminate different dipping directions in the subterranean formation.

20. A computing system, comprising:
one or more processors; and
a memory system comprising one or more non-transitory computer-readable media storing instructions that, when executed by at least one of the one or more processors, cause the computing system to perform operations, the operations comprising:
receiving seismic data that was collected from seismic waves that propagated in a subterranean formation;
generating a plurality of partition images using the seismic data;
generating a geological model of the subterranean formation;
determining dip fields in the plurality of partition images;
determining a target dip field in the geological model;
assigning weights to one or more partition images in the plurality of partition images based at least upon a relative angle between the respective dip fields and the target dip field to produce weighted partition images; and
generating the image of the subterranean formation by stacking the weighted partition images.

* * * * *